United States Patent
Bocquart

(10) Patent No.: US 7,281,544 B2
(45) Date of Patent: Oct. 16, 2007

(54) DEVICES AND METHODS FOR CONTROLLING THE RELEASE OF A SUBSTANCE

(75) Inventor: Jean-Marie Bocquart, Arnouville (FR)

(73) Assignee: Kidde IP Holdings Limited, Colnbrook, Slough (GB)

(*) Notice: Subject to any disclaimer, the term of this patent is extended or adjusted under 35 U.S.C. 154(b) by 64 days.

(21) Appl. No.: 11/079,436

(22) Filed: Mar. 14, 2005

(65) Prior Publication Data
US 2005/0217724 A1    Oct. 6, 2005

(30) Foreign Application Priority Data
Mar. 30, 2004   (GB) ................. 0407142.9

(51) Int. Cl.
F16K 17/40    (2006.01)
F16K 31/02    (2006.01)
A62C 37/46    (2006.01)

(52) U.S. Cl. .................. 137/68.19; 137/68.11; 137/68.27; 137/910; 169/58; 169/61; 220/89.2

(58) Field of Classification Search ............ 137/68.19, 137/68.27, 910; 220/89.2; 169/58, 61
See application file for complete search history.

(56) References Cited

U.S. PATENT DOCUMENTS

| 3,670,925 A | * | 6/1972 | Moyant .................. 222/3 |
| 3,780,752 A | * | 12/1973 | Noddin et al. ........... 137/68.13 |
| 4,199,029 A | * | 4/1980 | Marek .................. 169/61 |
| 4,905,722 A | * | 3/1990 | Rooker et al. ........... 137/68.27 |
| 5,144,973 A | * | 9/1992 | Green et al. ............ 137/71 |
| 5,631,634 A |   | 5/1997 | Strelow et al. |
| 5,979,477 A | * | 11/1999 | Stillings ................ 137/1 |
| 2002/0036090 A1 |   | 3/2002 | Gil |

FOREIGN PATENT DOCUMENTS

| DE | 2 032 957 |   | 1/1972 |
| DE | 197 36 247 A1 |   | 2/1999 |
| DE | 199 45 856 A1 |   | 4/2001 |
| DE | 102 40 096 B3 |   | 2/2004 |
| EP | 0033062 | * | 8/1981 |
| GB | 2 367 241 A |   | 4/2002 |
| RU | 2 092 204 C1 |   | 10/1997 |

OTHER PUBLICATIONS

Exhibit A, European Search Report for European Patent Application No. 05 25 1333, which is related to the present application.

* cited by examiner

Primary Examiner—Ramesh Krishnamurthy
(74) Attorney, Agent, or Firm—Merchant & Gould, P.C.

(57) ABSTRACT

Valves for controlling the release of a substance, include a housing having an inlet for connection to a source of the substance, an outlet, and a passage extending therebetween. The passage is enclosed by a ceramic disc and means are provided to apply an electrical pulse to the disc to break the disc and so connect the inlet to the outlet. The methods include containing the substance in a container, connecting the container to a valve; and applying an electrical pulse to the disc to break the disc and connect the inlet to the outlet. The valves and methods are particularly suited, but not limited, to the control of substances such as pressurised fire extinguishing media.

32 Claims, 3 Drawing Sheets

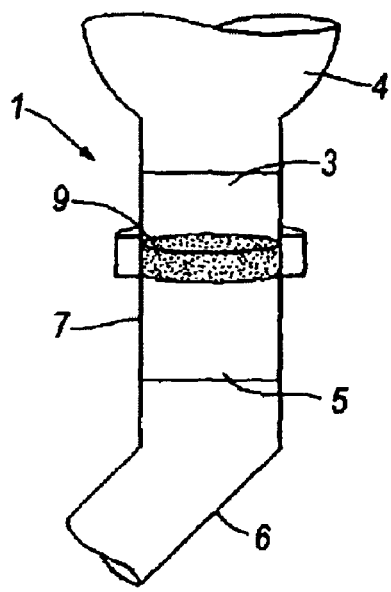
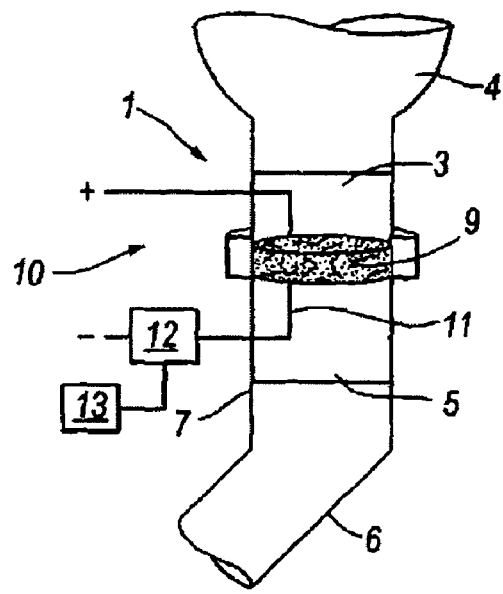
Fig. 1A  Fig. 1B
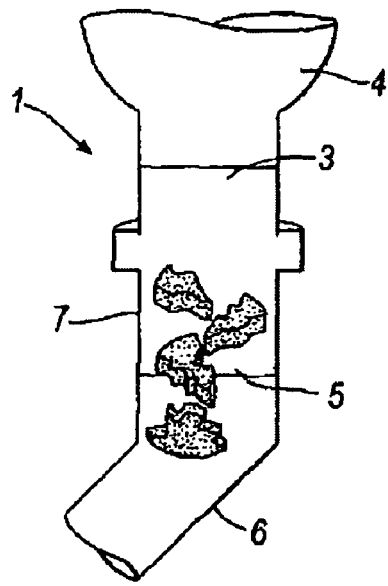
Fig. 1C

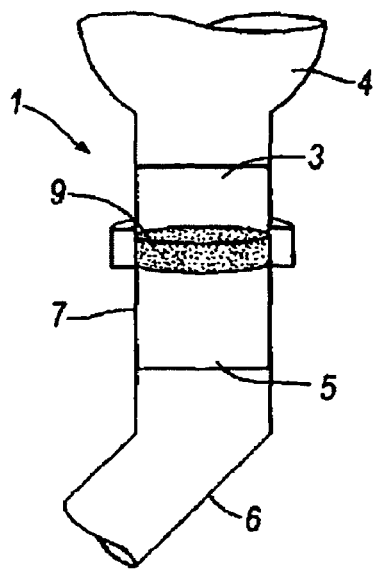
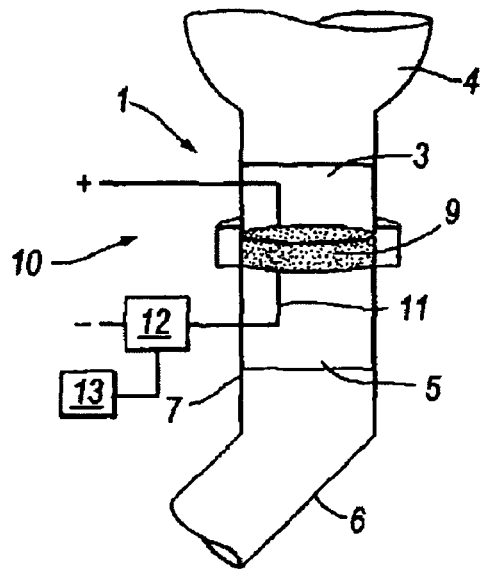
Fig.3A
Fig.3B
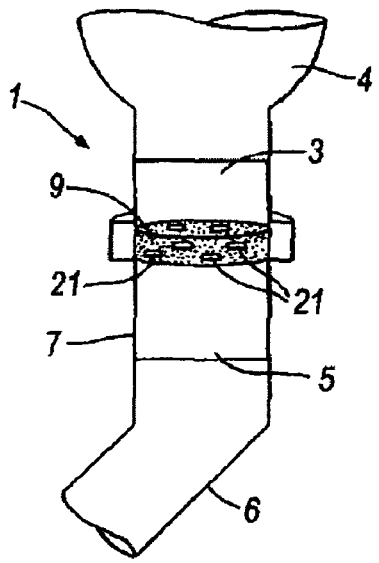
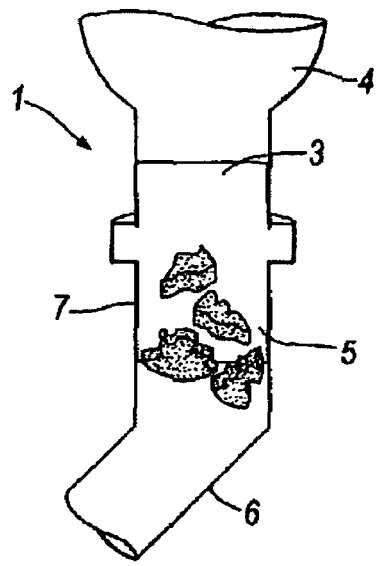
Fig.3C
Fig.3D
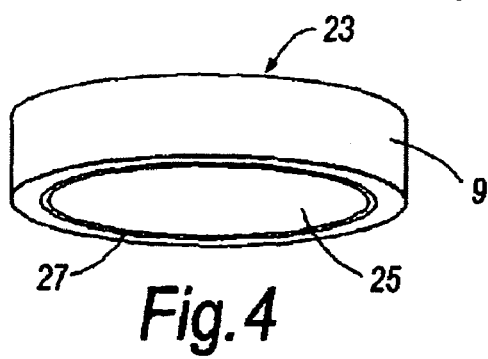
Fig.4

DEVICES AND METHODS FOR CONTROLLING THE RELEASE OF A SUBSTANCE

FIELD OF THE INVENTION

The invention relates to devices and methods for controlling the release of a substance. It is particularly suited, but not limited, to the control of substances such as pressurised fire extinguishing media.

A known device for controlling the release of a substance comprises a housing having an inlet for connection to a source of the substance, an outlet and a passage extending therebetween, the passage being closed by, for example, a frangible metal disc which may be disrupted by electromechanical or chemical (pyrotechnic or explosive) means to connect the inlet to the outlet and release the substance.

SUMMARY OF THE INVENTION

According to a first aspect of the invention there is provided a device for controlling release of a substance comprising a housing having an inlet for connection to a source of the substance, an outlet and a passage extending therebetween, the passage being closed by a ceramic member and means being provided to apply an electrical pulse to the member to break the member and so connect the inlet to the outlet.

According to a second aspect of the invention there is also provided a method for controlling the release of a substance, comprising the steps of containing the substance in a container, connecting the container to a device comprising a housing having an inlet for connection to the source of the substance, an outlet and a passage extending therebetween, the passage being closed by a ceramic member, and applying an electrical pulse to the ceramic member to break the member and so connect the inlet to the outlet.

BRIEF DESCRIPTION OF THE DRAWINGS

Apparatus and methods for controlling the release of a substance in the form of pressurised fire extinguishing media according to the invention will now be described, by way of example only, with reference to the accompanying drawings in which:

FIG. 1A shows a schematic elevation of a valve for controlling the release of pressurised fire extinguishing media connected between a source of the fire extinguishing media and an outlet, in which the passage between the source and outlet is closed by a first form of ceramic disc;

FIG. 1B is a similar view to FIG. 1A but showing an electrical circuit, a control system and a switch for controlling the opening of the device;

FIG. 1C is a similar view to FIGS. 1A and 1B but showing the ceramic member broken;

FIG. 3A is a similar view to FIG. 1A but showing a third form of ceramic member;

FIG. 3B is a similar view to FIG. 1B but showing the third form of ceramic member;

FIG. 3C is a similar view to FIG. 3A but showing the structure of the third form of ceramic member in more detail;

FIG. 3D is a similar view to FIG. 1C but showing the third form of ceramic member broken; and FIG. 4 is a perspective view of the first or second or third ceramic member including a circumferential groove.

In the drawings, like elements are generally designated with the same reference numeral.

DESCRIPTION OF THE PREFERRED EMBODIMENTS

Figure 2A:
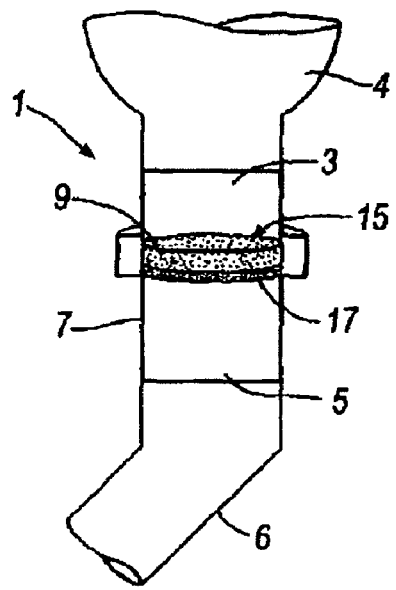
FIG. 2A is a similar view to FIG. 1A but showing a second form of ceramic member.

Referring to FIG. 1A, the valve 1 comprises a housing (not shown) made of metal or any other suitable material having an inlet 3, an outlet 5 and a passage 7 extending between the inlet 3 and the outlet 5. The inlet 3 is connected to a source 4 of pressurised fire extinguishing media and the outlet 5 to a delivery passage 6. The passage 7 is closed by a first form of ceramic disc 9. In this embodiment, the ceramic disc 9 comprises a single ceramic material having a low dielectric strength and described in more detail below. Referring to FIG. 1B, the ceramic disc 9 is connected to a source 10 of electrical current 11 via a controller 12 actuated by a switch or other means 13.

In use, the valve 1 is activated by operation of the switch or other means 13 which causes the controller to apply an electrical pulse to the disc 9. The electrical pulse causes a voltage over-stress or an electrical current over-stress in the ceramic disc 9 that leads to oxide breakdown within the ceramic material of the ceramic disc 9, resulting in cracks which propagate under pressure through the disc 9. This mechanism leads to the breakage of the disc 9, as depicted in FIG. 1C, thereby connecting the inlet 5 to the outlet 7 and allowing the release of the pressurised fire extinguishing media.

For optimisation of the breakage mechanism according to this first embodiment, the dielectric strength of the ceramic material forming the disc 9 is preferably equal to or lower than $10^5$ Vm$^{-1}$. For disc breakage resulting from voltage over-stress, the ceramic material is preferably one of a $ZrO_2/MgO$ composite, $MgO$, $MgAl_2O_4$, $Al_2O_3$ or $Y_2O_3$. For disc breakage resulting from electrical current over-stress the ceramic material is preferably one of $LaCrO_3$, $LaCoO_3$, $La_2NiO_4$ or $NiMn_2O_4$.

Figure 2B:
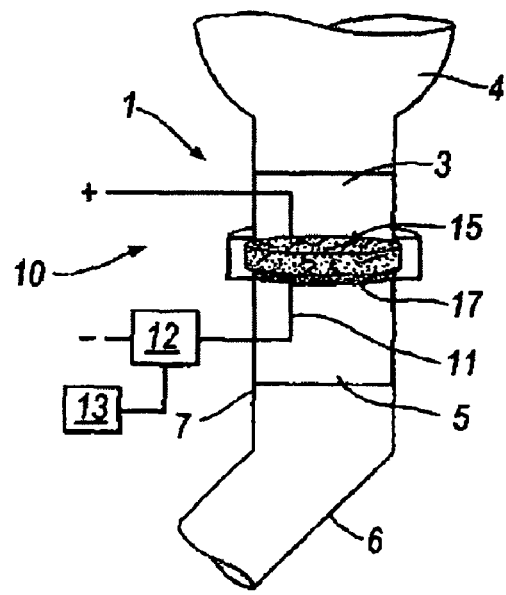
FIG. 2B is a similar view to FIG. 1B but showing the second form of ceramic member.
Figure 2C:
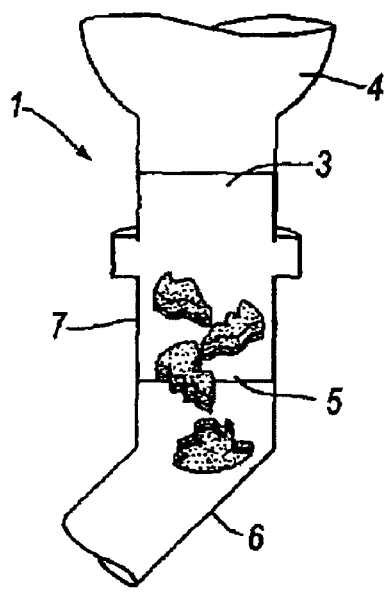
FIG. 2C is a similar view to FIG. 1C but showing the second form of ceramic member broken.

FIGS. 2A, 2B and 2C show a second embodiment of the invention. The valve 1 of FIG. 2A is generally the same as the valve 1 of FIG. 1A, with like elements being given the same reference numerals, and is not described in detail. In the second embodiment, there is a second form of ceramic disc 9 comprising first and second ceramic materials 15, 17 arranged to form first and second distinct layers, the first ceramic material 15 forming the first layer of the disc 9 (situated closer to the inlet 3) and having a relatively high thermal expansion coefficient and the second ceramic material 17 forming the second layer of the disc 9 (situated closer to the outlet 5) and having a relatively low thermal expansion coefficient.

In this second embodiment, application of the electrical pulse on operation of the switch 13 (see FIG. 2B) causes breakage of the ceramic disc 9 by thermal expansion. The first ceramic material 15 (having a relatively high thermal expansion coefficient) will expand to a greater extent than the second ceramic material 17 (having a relatively low thermal expansion coefficient). This mechanism leads to the breakage of the disc 9, as depicted in FIG. 2C, thereby connecting the inlet 9 to the outlet 5 and allowing the release of the fire extinguishing media.

In order to cause the disc to heat upon the application of an electrical pulse, one of the two ceramic materials 15, 17 must also have a low electrical resistivity. Low electrical resistivity is advantageously provided by the second ceramic material 17. Additionally, the surface of the disc 9 is advantageously metallised so that the electrical current circulation is uniform, thereby avoiding breakdown and favouring heat transfer between the two ceramic materials 15, 17. The surface of the disc 9 may be metallised by physical vapour deposition (PVD) or chemical vapour deposition (CVD), and the metal used is preferably aluminium based or nickel based.

For optimisation of the breakage mechanism according to this second embodiment, the difference between the thermal expansion coefficients of the ceramic materials 15, 17 is of the order of 5%. If the difference between the thermal expansion coefficients of the ceramic materials 15, 17 is too great, the disc 9 may unexpectedly break when the ambient temperature is increased. The relatively high thermal expansion coefficient first ceramic material 15 is preferably one of $Al_2O_3$, a $ZrO_2/Y_2O_3$ composite, a $ZrO_2MgO$ composite or MgO. The second ceramic material 17 forming the disc 9 and having a relatively low thermal expansion coefficient and electrical resistivity equal to or lower than $2.10^2$ Ohm.m is preferably one of $La_2NiO_4$, ZnO, $LaCrO_3$, $LaCoO_3$, or $NiMn_2O_4$.

Referring next to FIGS. 3A, 3B and 3C the valve 1 of these figures is generally the same as the valve 1 of FIGS. 1A to 1C and 2A to 2C, with like elements being given the same reference numerals, and is not described in detail. In the third embodiment, the third form of the ceramic disc 9 comprises a composite of a ceramic material 19, having a high thermal conductivity, and carbon. On activation of the valve 1 by operation of the switch 13, an electrical pulse is applied to the ceramic disc 9, which breaks by composite combustion. The electrical pulse heats the disc 9 leading to the combustion of the carbon within the disc 9 to cause vacancies 21 within the disc 9 (see FIG. 3C). The carbon combustion weakens the disc 9 which then breaks down due to the pressure exerted on the disc 9 by the fire extinguishing media (see FIG. 3D), thereby connecting the inlet 3 to the outlet 5 and allowing the release of the fire extinguishing media.

For optimisation of the breakage mechanism according to this third embodiment, the electrical resistivity of the ceramic material 19 comprising the disc 9 is preferably equal to or lower than $2.10^2$ Ohm.m. The ceramic material 19 is preferably one of $LaCrO_3$, SiC or $La_2NiO_4$. The carbon included in the disc 9 is preferably graphitic carbon.

In any one of the embodiments described herein with reference to FIGS. 1A to 1C, FIGS. 2A to 2C or FIGS. 3A to 3D, and in order to advantageously facilitate the breakage of the disc 9, the disc 9 may be formed with opposed first and second faces 23, 25 and with a groove 27 on the second face 25. This is shown in FIG. 4, in which the groove 27 is circumferential to the disc 9, the groove 27 being an annular groove 27 concentric with the disc 9 and located towards the periphery of the disc 9. The failure mechanism for the disc 9 in this case is the propagation of cracks and fracture from the groove 27 such that the centre of the disc 9 is removed to connect the inlet to the outlet and release the extinguishing media. In use, the ceramic disc 9 is mounted with the second face 25 facing the outlet 5. It has been found that less power is required to cause breakage of a disc 9 with such a groove 27 when compared to a disc 9 without such a groove 27. In one test, the electric field was found to be approximately three times stronger around the groove 27, as compared to a disc 9 without a groove 27, leading to a higher stress. The presence of the groove 27 also leads to cleaner and more controlled breakage of the disc 9. Although a groove 27 is described to facilitate breakage of the disc 9, other means may be provided for this purpose. For example, some other form of surface weakness may be used.

It will of course be appreciated by one skilled in the art that any suitable alternative ceramic material, combination of ceramic materials or ceramic composite could be used in accordance with the embodiments described herein. Additionally, the embodiments described herein are not intended to, and should not be taken to, limit the scope of the invention. It should instead be appreciated that any suitable arrangement of a housing comprising a ceramic disc for closing the passage between the inlet and the outlet could be used as a valve for controlling the release of a substance.

The valves described above control the release of a fire extinguishing medium. The control of the release of the fire extinguishing medium is by the breaking of a ceramic disc. The valve therefore can only operate once, whereafter intervention is required to replace the broken ceramic disc in order to allow the valve to operate again.

Although a frangible disc is described, it should be appreciated that this frangible element may be any suitable shape—for example, circular or rectangular—and may not be completely flat. The shape will generally be determined by the internal shape of the housing or pipe in which the frangible element is positioned. The frangible element will generally be a flat sheet or membrane of material.

It will also be appreciated by one skilled in the art that the devices described herein with reference to the accompanying drawings are not only suitable for controlling the release of any pressurised fire extinguishing medium taking the form of, for example, a liquid, a gas or a powder, but are equally as suitable for controlling the release of any other suitable substance.

The invention claimed is:

1. A device for controlling the release of a substance comprising a housing having an inlet for connection to a source of the substance, an outlet and a passage extending therebetween, the passage being closed by a ceramic member and means being provided to apply an electrical pulse to the ceramic member to break the ceramic member and so connect the inlet to the outlet, and wherein the ceramic member comprises a ceramic material containing a metal oxide and having a dielectric strength equal to or lower than $10^5 Vm^{-1}$.

2. A device according to claim 1, wherein the ceramic member is configured to provide means for facilitating breakage of the member on application of the electrical pulse.

3. A device according to claim 2, wherein the member has first and second opposed faces, the breakage facilitating means comprising a groove on the first surface of the member.

4. A device according to claim 3, wherein the first surface is closer to the outlet.

5. A device according to claim 4, wherein the ceramic member is a disc.

6. A device according to claim 5, wherein the groove is an annular groove concentric with the disc and located towards the periphery of the member.

7. A device according to claim 1, wherein the ceramic member comprises a $ZrO_2/MgO$ composite, MgO, $MgAl_2O_4$, $Al_2O_3$ or $Y_2O_3$.

8. A device according to claim 1, wherein the ceramic member comprises $LaCrO_3$, $LaCoO_3$, $LaNiO_4$ or $NiMn_2O_4$.

9. Fire extinguishing apparatus comprising:
a container containing a pressurised fire extinguishing medium; and
the device of claim 1 for controlling the release of the fire extinguishing medium;
wherein the container is connected to the inlet so that breakage of the ceramic member causes release of the fire extinguishing medium.

10. A device for controlling a release of a substance comprising a housing having an inlet for connection to a source of the substance, an outlet and a passage extending therebetween, the passage being closed by a ceramic member and means being provided to apply an electrical pulse to the ceramic member to break the ceramic member and so connect the inlet to the outlet, wherein the ceramic member comprises two ceramic materials arranged to form two distinct layers, the first ceramic material comprising the first layer of the member and having a relatively high thermal expansion coefficient and the second ceramic material comprising the second layer of the member and having a relatively low thermal expansion coefficient.

11. A device according to claim 10, wherein the first ceramic material has a thermal expansion coefficient that is 5% or less greater than the thermal expansion coefficient of the second ceramic material.

12. A device according to claim 10, wherein the first layer of the member is closer to the inlet.

13. A device according to claim 12, wherein the first ceramic material comprises $Al_2O_3$, a $ZrO_2/Y_2O_3$ composite, a $ZrO_2/MgO$ composite or MgO.

14. A device according to claim 12, wherein the second ceramic material has an electrical resistivity equal to or lower than $2.10^2$ Ohm·m.

15. A device according to claim 12, wherein the second ceramic material comprises $La_2NiO_4$, ZnO, $LaCrO_3$, $LaCoO_3$ or $NiMn_2O_4$.

16. Fire extinguishing apparatus comprising:
a container containing a pressurised fire extinguishing medium; and
the device of claim 10 for controlling the release of the fire extinguishing medium;
wherein the container is connected to the inlet so that breakage of the ceramic member causes release of the fire extinguishing medium.

17. A device for controlling a release of a substance comprising a housing having an inlet for connection to a source of the substance, an outlet and a passage extending therebetween, the passage being closed by a ceramic member and means being provided to apply an electrical pulse to the ceramic member to break the ceramic member and so connect the inlet to the outlet, wherein the ceramic member is a composite of a ceramic material and carbon.

18. A device according to claim 17, wherein the ceramic material has an electrical resistivity equal to or lower than $2.10^2$ Ohm·m.

19. A device according to claim 18, wherein the ceramic material comprises $LaCrO_3$, SiC or $La_2NiO_4$.

20. A device according to claim 17, wherein the carbon is graphitic carbon.

21. Fire extinguishing apparatus comprising:
a container containing a pressurised fire extinguishing medium; and
the device of claim 17 for controlling the release of the fire extinguishing medium;
wherein the container is connected to the inlet so that breakage of the ceramic member causes release of the fire extinguishing medium.

22. A method of controlling a release of a substance, comprising:
containing the substance in a container;
connecting the container to a device comprising a housing having an inlet for connection to the source of the substance, an outlet and a passage extending therebetween, the passage being closed by a ceramic member; and applying an electrical pulse to the ceramic member to break the ceramic member and so connect the inlet to the outlet, wherein the ceramic member comprises a ceramic material containing a metal oxide and having a dielectric strength equal to or lower than $10^5 Vm^{-1}$.

23. A method according to claim 22, further comprising the step of configuring the member to provide means for facilitating breakage of the member on application of the electrical pulse.

24. A method according to claim 23, wherein the member has first and second opposed faces, and providing means for facilitating breakage of the member comprises forming a groove on the first surface of the member.

25. A method according to claim 24, wherein the first surface is closer to the outlet.

26. A method according to claim 22, wherein the ceramic member is a disc.

27. A method according to claim 26, wherein the groove is an annular groove concentric with the disc and located towards the periphery of the disc.

28. A method of controlling a release of a substance, the method comprising:
containing the substance in a container;
connecting the container to a device comprising a housing having an inlet for connection to a source of the substance, an outlet, and a passage extending therebetween, the passage being closed by a ceramic member;
applying an electrical pulse to the ceramic member to break the ceramic member and so connect the inlet to the outlet; and
forming the ceramic member to comprise two distinct layers of two different ceramic materials, the first ceramic material comprising the first layer of the ceramic member and having a relatively high expansion coefficient and the second ceramic material comprising the second layer of the ceramic member and having a relatively low expansion coefficient.

29. A method according to claim 28, wherein the first ceramic material has a thermal expansion coefficient that is 5% or less greater than the thermal expansion coefficient of the second ceramic material.

30. A method of controlling a release of a substance, the method comprising:
containing the substance in a container;
connecting the container to a device comprising a housing having an inlet for connection to a source of the substance, an outlet, and a passage extending therebetween, the passage being closed by a ceramic member;
applying an electrical pulse to the ceramic member to break the ceramic member to connect the inlet to the outlet; and
forming the ceramic member from a composite of a ceramic material and carbon.

31. A device for controlling a release of a substance comprising:
a housing having an inlet for connection to a source of the substance, an outlet, and a passage extending therebetween, the passage being closed by a ceramic member; and means being provided to apply an electrical pulse to the ceramic member to break the ceramic member to connect the inlet to the outlet, wherein the ceramic member comprises a single ceramic material consisting of an oxide, the ceramic material having a dielectric strength which is sufficiently low such that the electrical pulse causes the ceramic member to break by causing voltage over-stress or current over-stress leading to oxide breakdown.

32. A method of controlling a release of a substance, comprising:

containing the substance in a container;

connecting the container to a device comprising a housing having an inlet for connection to the source of the substance, an outlet and a passage extending therebetween, the passage being closed by a ceramic member; and applying an electrical pulse to the ceramic member to break the ceramic member and so connect the inlet to the outlet, wherein the ceramic member comprises a single ceramic material consisting of an oxide, the ceramic material having a dielectric strength which is sufficiently low such that the electrical pulse causes the ceramic member to break by causing voltage over-stress or current over-stress leading to oxide breakdown.

\* \* \* \* \*